Patented Nov. 18, 1924.

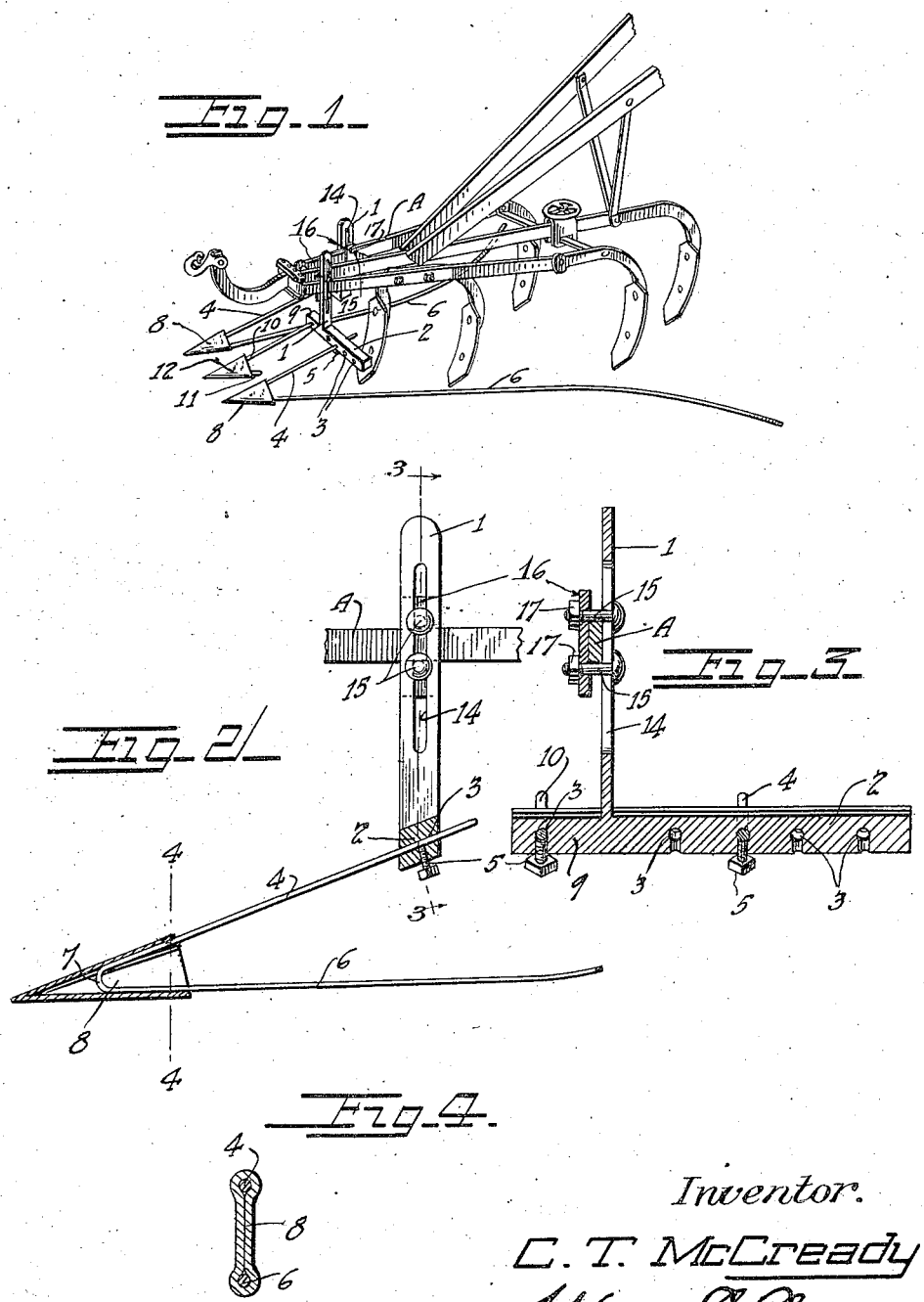

1,516,021

UNITED STATES PATENT OFFICE.

CHARLES T. McCREADY, OF ONLEY, VIRGINIA.

VINE TURNER.

Application filed November 13, 1922. Serial No. 600,731.

*To all whom it may concern:*

Be it known that I, CHARLES T. Mc-CREADY, a citizen of the United States, residing at Onley, in the county of Accomac and State of Virginia, have invented certain new and useful Improvements in Vine Turners, of which the following is a specification, reference being had to the accompanying drawings.

This invention relates to certain improvements in vine turners and has relation more particularly to a device of this general character especially designed and adapted for use in connection with a cultivator. It is an object of the invention to provide a novel and improved turner comprising a shoe or point which operates to materially facilitate the desired functioning of the device.

Another object of the invention is to provide a novel and improved turner which can be readily and conveniently attached to a cultivator frame or the like and in a manner whereby the position of the turner with respect to the ground may be regulated in accordance with the preferences of practice.

It is also an object of the invention to provide novel and improved means whereby a vine turner may be supported at the side of a row and also at the central portion of the row.

The invention consists in the details of construction and in the combination and arrangement of the several parts of my improved vine turner whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view in perspective of a cultivator having vine turners applied thereto and constructed in accordance with an embodiment of my invention;

Figure 2 is a fragmentary view partly in section and partly in elevation illustrating a turner constructed in accordance with an embodiment of my invention and in applied position;

Figure 3 is a sectional view taken substantially on the line 3—3 of Figure 2; and Figure 4 is a sectional view taken substantially on the line 4—4 of Figure 2.

As disclosed in the accompanying drawings, A denotes the side bars of a cultivator frame or the like and in connection with each of which is adapted to be employed a vine turner constructed in accordance with an embodiment of my invention.

As herein disclosed each of the turners comprises a vertically disposed arm 1 which is herein disclosed as having integrally formed with and perpendicularly thereto a transversely directed beam 2. The arm 1 is adapted to be secured to a side bar A as may be preferred but particularly in a manner to be hereinafter referred to. The beam 2 of each of the turners is provided at predetermined points spaced longitudinally thereof with an inclined opening 3, in which is adapted to be slidably disposed a forwardly and downwardly inclined arm 4. The arm 4 is fixed at its side with respect to the beam 2 through the instrumentality of a clamping bolt 5 or the like preferably threaded through the beam 2 from below and having clamping action on the portion of the rod 4 intersecting the beam 2.

The rod 4 at its lower end is continued by a rearwardly directed arm 6 positioned below the arm 4, said arms 4 and 6 being in forward convergence with their adjacent ends integrally connected as at 7.

The forward or converging end portions of the arms 4 and 6 are disposed within a point or shoe 8, the intermediate portion of said point or shoe 8, being inwardly spaced whereby the point or shoe 8 is effectively clamped to the arms 4 and 6 and maintained in desired position.

Each of the points or shoes 8 are substantially V-shaped in elevation with its lower longitudinal marginal edge substantially horizontally disposed with the upper edge of said point or shoe disposed on an inward and rearward incline. By this construction of the point or shoe 8, the same will properly pass below the vines as the cultivator or the like advances and effect the desired turning of the vines.

In practice one of my improved turners is secured to each side bar A of the cultivator as is clearly illustrated in Figure 1 with the beams 2 thereof outwardly disposed. The beam 2 of one of the turners is provided at its inner end with an extension arm 9 co-planer with the beam 2 and of a make to extend over the center of a row. Freely disposed through said extension arm 3 in the same manner as heretofore stated with respect to an arm 4 is an upwardly and rearwardly inclined arm 10 having its lower or forward end continued by a short arm 11. The adjacent end portions of the arms 10 and 11 are received within a point or shoe 12 and held thereto in the same manner as has been before described with respect to a point or shoe 8. This point or shoe 12 in practice is positioned at the center of a row and as the cultivator or the like advances serves to part the vines at the central portion of the row whereby the functioning of the points or shoes 8 is materially facilitated.

Each of the arms 1 is flat and extends across the outer face of the side bar A. The arm 1 is also provided with a longitudinally disposed slot 14 through which are directed bolts or headed shanks 15 said bolts or shanks being positioned above or below the adjacent side bar A and also disposed through a plate 16 arranged adjacent the inner face of the side bar A. Engaged with the bolts or shanks 15 and contacting with the plate 16 are the clamping nuts 17. Through the medium of the bolts or shanks 15 and through its associated nuts 17 and the plate 16, the arm 1 may be held in desired vertical adjustment so as to effect the desired positioning of the points 8 and 12.

From the foregoing description it is thought to be obvious that a vine turner constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A vine turner comprising, in combination with a support, a beam carried by the support therebelow and extending transversely of the support, a downwardly and forwardly directed rod slidably disposed through the beam, and means for holding the rod against movement independently of the support, and a shoe carried by the lower and forward end portion of the arm.

2. A vine turner comprising, in combination with a support, an arm depending from the support, a beam carried by the lower portion of the arm and extending beyond opposite sides thereof, forwardly and downwardly inclined rods carried by the beam at opposite sides of the arm, and shoes carried by the lower end portions of the rods.

3. In combination with the side bar of a cultivator, an arm depending from said bar, a beam carried by the arm below the bar and extending laterally thereof, a forwardly and downwardly inclined rod carried by the beam, and a shoe carried by the forward portion of the rod.

4. In combination with the side bar of a cultivator, an arm depending therefrom, a beam carried by the arm below the bar and extending beyond opposite sides of the bar, said beam being also disposed transversely of the cultivator, forwardly and downwardly directed rods carried by the beam at opposite sides of the arm, and shoes carried by the lower portions of the rods.

In testimony whereof I hereunto affix my signature.

CHARLES T. McCREADY.